United States Patent [19]

Wenderoth et al.

[11] Patent Number: 6,071,993
[45] Date of Patent: Jun. 6, 2000

[54] PARAFFIN DISPERSANTS FOR CRUDE OIL MIDDLE DISTILLATES

[75] Inventors: Bernd Wenderoth, Lampertheim; Ljiljana Uzelac, Ludwigshafen; Dieter Faul, Niederkirchen; Gabriele Dralle-Voss, Alsbach-Hähnlein, all of Germany

[73] Assignee: BASF Aktiengesellschaft, Ludwigshafen, Germany

[21] Appl. No.: 09/194,404

[22] PCT Filed: May 28, 1997

[86] PCT No.: PCT/EP97/02781

§ 371 Date: Nov. 30, 1998

§ 102(e) Date: Nov. 30, 1998

[87] PCT Pub. No.: WO97/46640

PCT Pub. Date: Dec. 11, 1997

[30] Foreign Application Priority Data

May 31, 1996 [DE] Germany .................... 196 22 052

[51] Int. Cl.⁷ ....................................... C08K 5/20
[52] U.S. Cl. ............................... 524/217; 44/346
[58] Field of Search ................ 44/346; 524/217

[56] References Cited

U.S. PATENT DOCUMENTS

| 3,048,479 | 8/1962 | Hayckyj | 44/62 |
| 3,627,838 | 12/1971 | Hayckyj | 260/87 |
| 4,416,668 | 11/1983 | Thompson | 44/62 |
| 5,344,863 | 9/1994 | Sakai | 524/291 |
| 5,376,155 | 12/1994 | Dralle-Voss | 44/408 |

FOREIGN PATENT DOCUMENTS

| 2017126 | 11/1990 | Canada . |
| 084148 | 7/1983 | European Pat. Off. . |
| 398101 | 11/1990 | European Pat. Off. . |
| 1147799 | 4/1963 | Germany . |
| 1914756 | 11/1969 | Germany . |
| 4237662 | 5/1994 | Germany . |
| 4430294 | 2/1996 | Germany . |
| 96/06902 | 3/1996 | WIPO . |

*Primary Examiner*—Paul R. Michl
*Attorney, Agent, or Firm*—Keil & Weinkauf

[57] ABSTRACT

A mixture contains (a) from 10 to 90% by weight of at least one imide of a copolymer based on an α-olefin and an ethylenically unsaturated dicarboxylic acid and a polyamine and (b) from 10 to 90% by weight of at least one reaction product of a poly($C_2$–$C_{20}$-carboxylic acid) having a tertiary amino group with secondary amines and is used as a paraffin dispersant in mineral oil middle distillates.

8 Claims, No Drawings

PARAFFIN DISPERSANTS FOR CRUDE OIL MIDDLE DISTILLATES

The present invention relates to a mixture containing (a) from 10 to 90% by weight of at least one imide of a copolymer based on an α-olefin and an ethylenically unsaturated dicarboxylic acid and a polyamine and (b) from 10 to 90% by weight of at least one reaction product of a poly($C_2$–$C_{20}$-carboxylic acid) having at least one tertiary amino group with secondary amines, and their use as additives for mineral oil middle distillates.

Mineral oil distillates, in particular middle distillates, such as gas oils, diesel oils or light fuel oils, which are obtained from mineral oils by distillation, have different proportions of n-paraffins depending on the origin of the crude oil, it being possible for said n-paraffins to crystallize on cooling. This point is defined as the cloud point (CP). On further cooling, the lamellar n-paraffin crystals form a sort of house-of-cards structure, so that the middle distillate (MD) sets although the predominant part is still liquid. This point is defined as the pour point, the point at which the middle distillate is still just flowable. The flowability, in particular of fuels, is very adversely affected by the precipitated paraffins in the temperature range between cloud point and pour point. The paraffins block filters and, in the case of fuels, cause a nonuniform fuel supply to the engine or completely stop this supply. Similar problems are encountered in the case of light fuel oils.

It is known that the crystal growth of the paraffins, in particular in distillate fuels, can be modified by suitable additives in the mineral oil distillate. On the one hand, effective additives prevent paraffins from forming such house-of-cards structures in middle distillates and the middle distillates from becoming solid at only a few °C. below the temperature at which the first crystals are precipitated. On the other hand, these additives result in the formation of fine, well crystallized, separate paraffin crystals which can pass through the filters, ensuring trouble-free fuel transport. The efficiency of the flow improves is determined indirectly by measuring the cold filter plugging point (CEPP), according to European Standard EN 116.

U.S. Pat. No. 3,048,479 relates to the improvement of the pour point characteristics of middle distillates and the flowability of the middle distillates at low temperatures. A copolymer of ethylene and of a vinyl fatty acid ester having 3 to 5 carbon atoms in the ester is described as a pour point depressant, said copolymer having a molecular weight of from 1,000 to 3,000 and containing from 15 to 25% by weight of the vinyl ester. In particular, an ethylene/vinyl acetate copolymer is described.

U.S. Pat. No. 3,627,838 relates to a process for the preparation of copolymers of ethylene and vinyl acetate for use as pour point depressants for improving the quality of middle distillates. The copolymer contains from 28 to 60% by weight of vinyl acetate and has a molecular weight of from 2000 to 6000.

German Laid-Open Application D-A-1,914,756 relates to a process for the preparation of copolymers and their use in distillate oils. The process is sued for preparing copolymers of ethylene and vinyl acetate, it being possible to keep the proportion of branched ethylene chains small. The molar ratio of ethylene to vinyl acetate is from 4.2 to 6.2. The copolymers are used as pour point depressants and for improving the flow properties of the distillate oils.

German Patent 1,147,799 relates to a mineral oil distillate power fuel or combustion fuel. The combustion fuel or power fuel contains a copolymer of ethylene and vinyl acetate having a molecular weight of from about 1000 to 3000. The copolymer is used for improving the flowability at low temperatures.

EP-A-0 084 148 relates to mineral oil middle distillates having improved flow properties. Said distillates contain from 0.005 to 0.5% by weight of an ethylene/vinyl propionate copolymer having a molecular weight of from 1000 to 3000 and a vinyl propionate content of from 5 to 29% by weight, based on the copolymer. The copolymer is used as a flow improver.

Because they have a higher density than the liquid part, the precipitated paraffin crystals tend to settle out to an increasing extent on the bottom of the container during storage of the mineral oil middle distillate compositions. Consequently, a homogeneous layer having a low paraffin content forms in the upper part of the container and a two-phase layer having a higher paraffin content forms at the bottom. In vehicle tanks, as well as in storage or delivery tanks of mineral oil dealers, the mineral oil middle distillate is often withdrawn only slightly above the bottom of the tank. There is thus the danger that filters and metering means will be blocked when there is a high concentration of solid paraffins in this region.

These problems can be reduced by the additional use of paraffin dispersants (wax antisettling additives).

EP-A1-0 398 101 relates to reaction products of aminoalkylenepolycarboxylic acids with secondary amines and mineral oil middle distillate compositions which contain these. In addition to ethylene/vinyl propionate copolymers, ethylene/vinyl acetate copolymers or ethylene/ethylhexyl acrylate copolymers, in particular nitriloacetamides are used as flow improvers in mineral oil middle distillate compositions in order to improve the cold flowability of the mineral oil middle distillate compositions in order to improve the dispersing of precipitated paraffin crystals.

WO 96/06902 relates to polymer blends and their use as additives for mineral oil middle distillates. The polymer blends contain an imide of a copolymer based on an α-olefin and an ethylenically unsaturated dicarboxylic acid and a polyamine and a copolymer which differs therefrom and contains at least two monomers from the group consisting of ethylene, acrylates, vinyl esters, vinyl ethers and ethylenically unsaturated dicarboxylic acids or dicarboxylic acid derivatives. The copolymer preferably contains at least the monomers ethylene and vinyl ester, and is in particular an ethylene/vinyl propionate copolymer.

The dispersing effect of the paraffin dispersants described in EP-A-0 398 101 is not sufficient in all mineral oil middle distillate compositions. In the case of the paraffin dispersants described in WO 96/06902, the flowability of the mineral oil middle distillate compositions prepared therewith is insufficient.

It is an object of the present invention to provide a paraffin dispersant for mineral oil middle distillate compositions which is effective for a large number of mineral oil middle distillates.

It is a further object of the present invention to provide paraffin dispersants which, in combination with flow improvers, improve the flow properties of mineral oil middle distillate compositions.

It is a further object of the present invention to provide paraffin dispersants which can be used in the form of a concentrated solution.

We have found that these and further objects are achieved by a mixture as stated above and by concentrates and mineral oil middle distillate compositions as defined in the following.

COMPONENT(a)

The novel mixtures contain from 10 to 90% by weight of the imide of a copolymer based on an α-olefin and an ethylenically unsaturated dicarboxylic acid and a polyamine (component (a)), which is also referred to below as copolymer(a).

The copolymers (a) generally have a weight average molecular weight of from 200 to 50000, preferably from 500 to 20000. The copolymers (a) preferably contain from 30 to 70, particularly preferably from 40 to 60, mol % of α-olefin and from 30 to 70, particularly preferably from 40 to 60, mol % of the imide of an ethylenically unsaturated dicarboxylic acid and a polyamine, the percentages in each case being based on the amount of (a). An alternating copolymer having equal molar amounts of imide and α-olefin is very particularly preferred.

In general, branched or straight-chain α-olefins of the general formula I

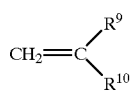
(I)

where $R^9$ is hydrogen or $C_1$–$C_{10}$-alkyl and $R^{10}$ is alkyl, alkenyl or aryl, are used. For example, α-olefins such as 1-butene, 1-hexene, 1-octene, 1-decene, 1-dodecene, 1-tetradecene, 1-hexadecene, 1-octadecene and mixtures of 1-alkenes of 20–24 or 24–28 carbon atoms and longer-chain polyethylene derivatives having a terminal CC double bond are suitable. Polymeric propene, butene and isobutene derivatives having an unsaturated terminal group are also useful. Aryl-substituted olefins, eg. styrene, are also suitable.

α-Olefins having chain lengths of $C_{12}$ to $C_{40}$, in particular straight-chain α-olefins having chain lengths of $C_{12}$ to $C_{28}$ and especially those having a chain length of $C_{16}$ to $C_{24}$ are preferred.

$C_{20}$–$C_{24}$-α-olefins are very particularly preferably used according to the invention. These are in general mixtures of α-olefins which contain more than 80% by weight of α-olefins of 20 to 24 carbon atoms.

The novel copolymers (a) can moreover contain up to 10 mol % of at least one further ethylenically unsaturated monomer. Examples of suitable monomers are acrylic acid, methacrylic acid, esters derived therefrom and stearyl vinyl esters, vinyl ethers and vinyl esters.

Examples of suitable ethylenically unsaturated dicarboxylic acids on which the copolymers (a) are based are monoethylenically unsaturated dicarboxylic acids of 4 to 8 carbon atoms, eg. maleic acid, itaconic acid, mesaconic acid, citraconic acid and methylenemalonic acid. Among the stated acids, maleic acid and itaconic acid are preferred, maleic acid being very particularly preferred.

In addition to the dicarboxylic acids, the corresponding dicarboxylates or dicarboxylic anhydrides can of course also be used for the preparation of the imides.

The ethylenically unsaturated dicarboxylic acids or dicarboxylic acid derivatives preferred according to the invention for this purpose may be summarized by the general formula II

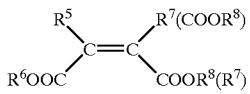
(II)

where $R^5$ to $R^8$, independently of one another, are each hydrogen or a $C_1$–$C_{22}$-alkyl radical which may contain heteroatoms, the corresponding anhydrides also being possible in the case of cis-dicarboxylic acids of the formula II (where $R^6$ and $R^8$ are each H).

It is generally advantageous to use the dicarboxylic acid derivatives in the form of the anhydrides in the copolymerization. The anhydride groups of the copolymers initially formed can then be reacted directly with the polyamines.

Examples of these are maleic anhydride, itaconic anhydride, citraconic anhydride and methylenemalonic anhydride.

For the purposes of the present invention, polyamines are amines which contain at least two nitrogen atoms.

According to the invention, polyamines of the formula III

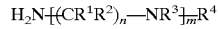
(III)

where n is from 1 to 6, m is from 1 to 3, $R^1$ and $R^2$, independently of one another, are each hydrogen, methyl or ethyl, $R^3$ is hydrogen, $C_{2-24}$-alkenyl, $C_{1-24}$-alkyl or $C_{1-18}$-aryl and $R^4$ is hydrogen, $C_{1-24}$-alkyl, $C_{2-24}$-alkenyl, $C_{6-18}$-aryl, amine-containing $C_{2-24}$-alkenyl or amine-containing alkyl, are preferably used.

Examples of polyamines of the formula III which are suitable according to the invention are N-cyclohexyl-1,3-propylenediamine; N-2-ethylhexyl-1,3-propylenediamine; N-dodecyl-1,3-propylenediamine; N-stearyl-1,3-propylenediamine; N-oleyl-1,3-propylenediamine; N-3-aminopropyl-tallow fatty amine; N-arachidyl-1,3-propylenediamine; N-behenyl-1,3-propylenediamine; N-benzyl-1,3-propylenediamine; 2-aminoethylstearylamine; 2-aminoethylbehenylamine; 2-aminoethyloleylamine; 2-aminoethyl-tallow fatty amine; N-stearylbishexamithylene-1,6-diamine; N-stearyldipropylenetriamine; N-dodecyl-dipropylenetriamine; N,N-dimethyl-1,3-propylenediamine; N,N-ditridecyl-1,3-propylenediamine; N,N-bis(2-ethylhexyl)-3-aminopropyleneamine; bisaminopropyl-tallow fatty amine; bisaminopropyllaurylamine; 1-(2-aminopropyl)stearylamine; 1-(2-aminopropyl)piperazine; N-2-aminoethylpiperidine; N-3-aminopropylimidazole.

According to the invention, polyamines of the formula IV

(IV)

where $R^4$ is alkyl, alkenyl, aryl, amine-containing alkyl, amine-containing alkenyl or hydrogen as above, are particularly preferably used. Among these, N-tallow fatty-1,3-diaminopropane is particularly suitable.

Here, N-tallow fatty-1,3-diaminopropane is in particular a mixture of diamines of the formula IV which differ in the alkyl radical $R^4$. The distribution of the alkyl radicals is roughly as follows (in % by weight): 1% of $C_{12}$, 3% of $C_{14}$, 30% of $C_{16}$, 25% of $C_{18}$, 40% of $C_{18}$ (having a double bond) and 1% of $C_{20-22}$.

In a preferred embodiment of the invention, component (a) is the imide which is derived from a $C_{12}$–$C_{40}$-α-olefin, preferably $C_{12}$–$C_{20}$-α-olefin, in particular $C_{20}$–$C_{24}$-α-olefin/maleic anhydride copolymer and a polyamine.

The secondary or tertiary amino groups contained in the copolymers a) may also be present in quaternized form, for example as a result of reaction of the imides with inorganic or organic acids or alkylation with known alkylating reagents. Here, alkylation means in particular the introduction of an alkyl, alkenyl or hydroxyalkyl group. Corresponding opposite ions would be, for example, the anions of an organic or inorganic acid, eg. $CH_3SO_3^-$, $SO_4^{2-}$ or alk(en)yl-$CO_2$—.

The preparation of component (a) is carried out in general by copolymerization by the process stated in WO 96/06902.

The weight average molecular weight of the novel copolymers (a) is in general from 200 to 50000, preferably from 500 to 20000.

COMPONENT (b)

Component (b) is a reaction product of a poly($C_2$–$C_{20}$-carboxylic acid) having at least one tertiary amino group with secondary amines.

The polycarboxylic acid contains at least 3, preferably 3 to 12, in particular 3 to 5, carboxyl groups. The carboxyl groups in the polycarboxylic acid are preferably of 2 to 10 carbon atoms, acetic acid groups being preferred.

embodiment of the invention, component (b) is an amide, an amide-ammonium salt or an ammonium salt, or a mixture of said salts, of aminoalkylenepolycarboxylic acids of the formulae V and VI

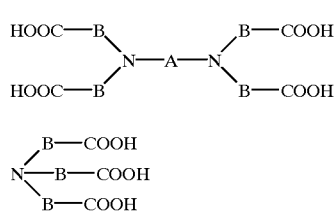

where A is straight-chain or branched alkylene of 2 to 6 carbon atoms or a radical of the formula VII

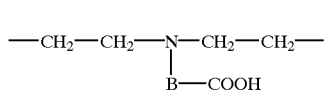

where B is a radical of 1 to 19 carbon atoms, preferably $C_1$–$C_{19}$-alkylene, in particular methylene, A preferably being ethylene.

The secondary amine is preferably of the formula $HNR_2$, where the radicals R are essentially straight-chain aliphatic radicals, in particular alkyl of 10 to 30, preferably 14 to 24, carbon atoms.

The secondary amines may be linked to the polycarboxylic acid by means of amide structures or in the form of ammonium salts, also partly by means of amide structures and partly in the form of the ammonium salts.

Preferably, they are completely linked in the form of the amide structures.

The amides or amide-ammonium salts or ammonium salts, for example of nitrilotriacetic acid, of ethylenediaminetetraacetic acid or of propylene-1,2-diaminetetraacetic acid, are obtained by reacting the acids with from 0.5 to 1.5, preferably from 0.8 to 1.2, mol of amine per carboxyl group.

The reaction temperatures are from about 80 to 200° C., the resulting water of reaction being removed continuously for the preparation of the amides. However, the reaction need not be continued until complete conversion to the amide; rather, from 0 to 100 mol % of the amine used may be present in the form of the ammonium salt. Particularly preferred amines are dioleylamine, dipalmitylamine, di-coconut fatty amine and dibehenylamine, in particular di-tallow fatty amine.

Components (b) which may be used according to the invention are furthermore described in EP-A1-0 398 101.

In an embodiment of the invention, component (b) may contain small amounts of conductivity improvers in the form of salts, in particular of hydrocarbon-soluble carboxylic acids and sulfonic acids or metal and ammonium slats thereof. The conductivity improvers may serve to increase the dispersibility of the solid paraffins formed.

The polymer mixtures according to the invention can be prepared by simply mixing the components (a) and (b), preferably in a weight ratio of from 10:1 to 1:10, in particular from 3:1 to 1:3.

The novel polymer mixtures are used as additives for mineral oil middle distillates, which are understood as meaning petroleum, light fuel oils and diesel fuels having a boiling point of from about 150 to 400° C. The polymer mixtures can be added directly to the middle distillates but are preferably added in the form of from 20 to 70% strength by weight solution (concentrate). Suitable solvents are aliphatic or aromatic solvents, such as xylene, or mixtures thereof, and high-boiling mixtures of aromatics, such as solvent naphtha, and middle distillates. The amount of polymer mixture in the mineral oil middle distillates is as a rule from 10 to 10,000, preferably from 20 to 5,000, particularly preferably from 50 to 1,000, ppm. Depending on the intended use, the middle distillates may contain further additives, for example dispersants, antifoams, anticorrosion agents, antioxidants, demulsifiers, lubricity improvers, conductivity improvers and/or dyes and fragrances.

As a rule, the mineral oil middle distillates also contain fuel improvers, for example based on ethylene/vinyl carboxylate copolymers, in particular ethylene/vinyl acetate copolymers or ethylene/vinyl propionate copolymers.

Regardless of their origin, the novel polymer mixtures result in a substantial improvement in the low-temperature flow properties in middle distillates by effectively keeping precipitated paraffin crystals in suspension so that filters and lines do not become blocked by paraffin which has settled out. They have good broad efficiency and thus ensure that the precipitated paraffin crystals are very well dispersed in different middle distillates.

The Examples which follow further illustrate the invention.

EXAMPLES

In the Examples which follow, percentages are by weight.

Example 1

COMPONENT (a)

The maleic anhydride/$C_{20}$–$C_{24}$-α-olefin copolymer used contained both monomers in equimolar amounts and had a weight average molecular weight of 3500.

255 g of a 50% strength solution of a maleic anhydride/$C_{20}$–$C_{24}$-α-olefin copolymer was heated slowly to 160° C.

with 100.2 g of aminopropyl-tallow fatty amine (Duomeen®T from Akzo). The solution was stirred for a few hours at this temperature under a stream of nitrogen and the condensation water was distilled off. After 2 hours, the acid number of the product was 5.4 mg KOH/g. In the IR spectrum, the imide band at 1700 cm$^{-1}$ was clearly evident. The product obtained was diluted with 75 g of solvent naphtha so that the solids content of the product was 50%.

Example 2

COMPONENT (b)

240 g (0.48 mol) of di-tallow fatty amine and 35 g (0.12 mol) of ethylenediaminetetraacetic acid were melted and were heated to 190° C., the resulting water of reaction being continuously distilled off. The reaction was terminated after about 25 hours at an acid number of less than 10 and an amine number of less than 1.1. The water of reaction was completely removed by applying reduced pressure from a water jet pump (2 hours, 120° C.) 265 g of brown, waxy solid were obtained. The resulting product was diluted with solvent naphtha so that the solids content of the product was 50% by weight.

Mineral oil middle distillate compositions

The novel mixtures were tested in two commercial German winter diesel fuels which comply with the European diesel fuel standard EN 590. They are referred to below as DK 1 and DK 2 and have the following physical data:

|  | DK 1 | DK 2 |
|---|---|---|
| Cloud point (° C.) according to ISO 3015 | −8 | −7 |
| CFPP (° C.) according to EN116 | −12 | −11 |
| Density at 15° C. (kg/m$^3$) according to ASTM D 4052 | 830 | 839 |
| Distillation according to ISO 3405: | | |
| Initial boiling point (° C.) | 186 | 197 |
| 10% boiling point (° C.) | 210 | 223 |
| 20% boiling point (° C.) | 220 | 235 |
| 50% boiling point (° C.) | 254 | 268 |
| 90% boiling point (° C.) | 322 | 328 |
| 95% boiling point (° C.) | 340 | 345 |
| Final boiling point (° C.) | 359 | 353 |

The following mixtures were prepared from the components according to Example 1 and Example 2:

Mixture PD 1: 50% by weight of Example 1, 50% by weight of Example 2

Mixture PD 2: 60% by weight of Example 1, 40% by weight of Example 2

Mixture PD 3: 40% by weight of Example 1, 60% by weight of Example 2

VGL 1: 100% of Example 1

VGL 2: 100% of Example 2

VGL 1 and VGL 2 are Comparative Examples of the respective individual components.

Also used was a flow improver (MDFI) which is a product based on ethylene/vinyl propionate and marketed under the trade name Keroflux®5486 by BASF AG.

The mineral oil middle distillates were mixed with the amounts, stated in the Table below, of the novel mixtures PD 1 to PD 3 or with the comparative mixtures VGL 1 and VGL 2 and with the flow improver MDFI at 40° C. with stirring and then cooled to room temperature.

The cold filter plugging point (CFPP) according to EN 116 of each additive-containing mineral oil middle distillate was determined.

The mineral oil middle distillates containing additives were then cooled in 500 ml glass cylinders in a cold bath from room temperature to −13° C. and were stored at this temperature for 20 hours. The amount and the appearance of the paraffin phase were then determined and assessed visually. Thereafter, at −13° C., 20% by volume of the bottom phase was separated off from each sample and the cold filter plugging point (CFPP) according to EN 116 and the cloud point according to ISO 3015 were determined. The smaller the deviation of the cloud point of the 20% by volume bottom phase from the original CP of the respective middle distillate, the better the dispersing of the paraffins.

The results obtained are shown in Tables 1 and 2 below:

TABLE 1

Dispersing tests in DK 1, CP: −8° C., CFPP: −12° C.

| Examples | Dose (ppm) | MDFI (ppm) | CFPP (° C.) | Paraffin sediment (% by vol.) | Dispersed paraffins (% by vol.) | 20% bottom phase CFPP (° C.) | 20% bottom phase CP (° C.) |
|---|---|---|---|---|---|---|---|
| PD 1 | 150 | 200 | −31 | 1 | 99 | −21 | −6 |
| PD 2 | 150 | 200 | −30 | 3 | 97 | −21 | −7 |
| PD 3 | 150 | 200 | −32 | 4 | 96 | −30 | −6 |
| VGL 1 | 150 | 200 | −19 | 1 | 99 | −17 | −7 |
| VGL 2 | 150 | 200 | −32 | 28 | 72 | −23 | −1 |

TABLE 2

Dispersing tests in DK 2, CP: −7° C., CFPP: −11° C.

| Examples | Dose (ppm) | MDFI (ppm) | CFPP (° C.) | Paraffin sediment (% by vol.) | Dispersed paraffins (% by vol.) | 20% bottom phase CFPP (° C.) | 20% bottom phase CP (° C.) |
|---|---|---|---|---|---|---|---|
| PD 1 | 150 | 200 | −28 | 14 | 86 | −24 | −4 |
| PD 2 | 150 | 200 | −27 | 10 | 90 | −27 | −6 |
| PD 3 | 150 | 200 | −29 | 18 | 82 | −26 | −4 |
| VGL 1 | 150 | 200 | −22 | 4 | 96 | −24 | −6 |
| VGL 2 | 150 | 200 | −29 | 34 | 66 | −20 | −2 |

The test results show that mineral oil distillates containing the novel mixtures have a very low CFPP and at the same time a minimum amount of paraffin sediment.

In DK 1 and DK 2, Comparative Example EVL 1 leads to a poor (high) CFPP. High values of paraffin sediment and a high cloud point of the 20% bottom phase are obtained for VGL 2.

This shows that the low-temperature flow properties can be substantially improved by the novel mixtures of the components (a) and (b) in mineral oil middle distillates, regardless of the origin. The precipitated paraffin crystals are effectively kept in suspension so that blockages of filters and lines by paraffin which has settled out can no longer occur. The novel mixtures have a good broad action and ensure that the precipitated paraffin crystals are very well dispersed in different middle distillates. At the same time, they are able to improve the cold filter plugging point (CFPP).

We claim:

1. A mixture containing
   (a) from 10 to 90% by weight of at least one imide of a copolymer based on an α-olefin and an ethylenically unsaturated dicarboxylic acid and a polyamine and
   (b) from 10 to 90% by weight of at least one reaction product of a poly($C_2$–$C_{20}$-carboxylic acid) having at least one tertiary amino group with secondary amines.

2. A mixture as claimed in claim 1, wherein the polyamine is an amine of the formula III $$H_2N\text{---}[(CR^1R^2)_n\text{---}NR^3]_m R^4 \quad \text{(III)}$$

where
n is from 1 to 6,
m is from 1 to 3,
$R^1$ and $R^2$, independently of one another, are each hydrogen, methyl or ethyl,
$R^3$ is hydrogen, $C_{2-24}$-alkenyl, $C_{1-24}$-alkyl or $C_{6-18}$-aryl and
$R^4$ is hydrogen, $C_{1-24}$-alkyl, $C_{2-24}$-alkenyl, $C_{6-18}$-aryl, amine-containing $C_{2-24}$-alkenyl or amine-containing $C_{1-24}$-alkyl, and/or wherein the poly($C_2$–$C_{20}$-carboxylic acid) having at least one tertiary amino group is of the following formulae V or VI

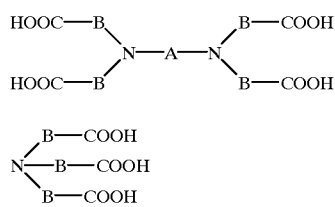

where A is straight-chain or branched alkylene $C_2$–$C_6$-alkylene or a radical of the formula VII

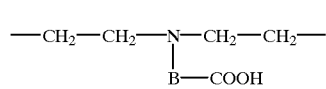

where B is $C_1$–$C_{19}$-alkylene, preferably methylene.

3. A mixture as claimed in claim 1, wherein the reaction product (b) is an amide, amide-ammonium slat or ammonium salt in which no carboxyl group, one carboxyl group or a plurality of carboxyl groups is or are converted into amido groups, or wherein the secondary amine is of the formula $HNR_2$, where R is straight-chain or branched $C_{10}$–$C_{30}$-alkyl.

4. A mixture as claimed in claim 1, wherein the polyamine is an amine of the formula IV $$R^4\text{---}NH\text{---}CH_2\text{---}CH_2\text{---}NH_2 \quad \text{(IV)}$$

where $R^4$ is $C_{1-24}$alkyl, $C_{2-24}$-alkenyl, $C_{6-18}$-aryl, amine-containing $C_{1-24}$-alkyl, amine-containing $C_{2-24}$-alkenyl or hydrogen.

5. A mixture as claimed in claim 1, wherein the copolymer of component (a) is an α-olefin/maleimide copolymer, preferably of a $C_{12}$–$C_{40}$-α-olefin, or wherein A in component (b) is an ethylene radical,
or wherein R in component (b) is a tallow fatty radical, wherein all of the above features are present.

6. A mineral oil middle distillate containing a mixture as claimed in claim 1.

7. A mineral oil middle distillate as claimed in claim 6, furthermore containing a copolymer suitable as a middle distillate flow improver, in particular an ethylene/vinyl acetate copolymer or an ethylene/vinyl propionate copolymer.

8. A concentrate containing from 10 to 60% by weight, based on the total amount of the concentrate, of a mixture as claimed in claim 1, dissolved in a hydrocarbon solvent.

* * * * *

UNITED STATES PATENT AND TRADEMARK OFFICE
CERTIFICATE OF CORRECTION

PATENT NO.: 6,071,993

DATED: June 6, 2000

INVENTOR(S): WENDEROTH et al.

It is certified that error appears in the above-identified patent and that said Letters Patent is hereby corrected as shown below:

Col. 10, claim 3, line 2, "slat" should be --salt--.

Signed and Sealed this

Twenty-seventh Day of March, 2001

Attest:

NICHOLAS P. GODICI

Attesting Officer

Acting Director of the United States Patent and Trademark Office